United States Patent
Ishiji et al.

(10) Patent No.: US 8,084,092 B2
(45) Date of Patent: Dec. 27, 2011

(54) WATER-INSOLUBLE COLORANT DISPERSION, PRODUCTION METHOD THEREOF, AND RECORDING LIQUID, INK SET, IMAGE-FORMING METHOD AND IMAGE-FORMING APPARATUS USING THE SAME

(75) Inventors: Yohei Ishiji, Fujinomiya (JP); Michio Ono, Kanagawa (JP); Ryo Saito, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 137 days.

(21) Appl. No.: 12/400,453

(22) Filed: Mar. 9, 2009

(65) Prior Publication Data

US 2009/0232990 A1  Sep. 17, 2009

(30) Foreign Application Priority Data

Mar. 10, 2008  (JP) ................. 2008-060277

(51) Int. Cl.
*C08L 33/02*  (2006.01)
*B05D 5/06*  (2006.01)

(52) U.S. Cl. .......... 427/256; 524/556; 524/90; 524/105; 524/190; 347/100

(58) Field of Classification Search .................. 427/256; 524/556, 90, 105, 190; 347/100
See application file for complete search history.

(56) References Cited

U.S. PATENT DOCUMENTS

| | | | |
|---|---|---|---|
| 2004/0030002 A1* | 2/2004 | Tsuru et al. | 523/160 |
| 2005/0124728 A1* | 6/2005 | Komatsu et al. | 523/160 |
| 2007/0123608 A1 | 5/2007 | Nakahama et al. | |

FOREIGN PATENT DOCUMENTS

| | | |
|---|---|---|
| EP | 1 215 251 A1 | 6/2002 |
| EP | 1 364 997 A2 | 11/2003 |
| JP | 2004-043776 A | 2/2004 |
| JP | 2006-057044 A | 3/2006 |
| JP | 2007-119586 A | 5/2007 |

* cited by examiner

*Primary Examiner* — Robert D. Harlan
(74) *Attorney, Agent, or Firm* — Sughrue Mion, PLLC

(57) ABSTRACT

A water-insoluble colorant dispersion prepared by a production method including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the Formula (I) or (II), and mixing the obtained solution with an aqueous medium; characterized by containing water-insoluble colorant fine particles, a polymer compound having one or more acid groups selected from the group consisting of carboxylic acid group, sulfonic acid group and phosphoric acid group as hydrophilic group, an aqueous medium, and a phase-transfer base represented by the Formula (I) or (II):

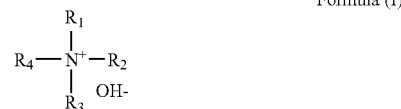

Formula (I)

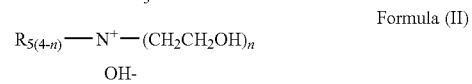

Formula (II)

wherein $R_1$ to $R_5$ each independently represents a methyl, ethyl or propyl group, n represents an integer of 1 to 4.

19 Claims, No Drawings

WATER-INSOLUBLE COLORANT DISPERSION, PRODUCTION METHOD THEREOF, AND RECORDING LIQUID, INK SET, IMAGE-FORMING METHOD AND IMAGE-FORMING APPARATUS USING THE SAME

FIELD OF THE INVENTION

The present invention relates to a water-insoluble colorant dispersion, a production method of the dispersion, and a recording liquid, ink set, image-forming method and image-forming apparatus using the dispersion.

BACKGROUND OF THE INVENTION

According to an inkjet recording method, high speed recording can be performed with a high freedom degree of imaging pattern and a low noise at the time of recording. Further, image recording can be performed at low cost. Still further, the inkjet recording method has advantages such that color recording can be readily performed. Therefore, recently the inkjet recording method is rapidly spreading and further developing. As a recording liquid for the method, hitherto a dye ink, in which a water-soluble dye is dissolved in an aqueous medium, has been widely used. However, the dye ink is poor in water resistance and weather resistance of the resultant printed article (printed matter). Therefore, studies of the dye ink have been made to improve such disadvantage.

A pigment ink is ordinarily obtained by dispersing a water-insoluble pigment in an aqueous medium. It is general to use a method which includes adding a pigment together with one or plurality of dispersing agents such as various kinds of surfactants or water-soluble polymers to an aqueous solvent, and pulverizing them using a dispersing device such as a sand mill, a bead mill, or a ball mill, to make the diameter of the pigment particle small to fine (see JP-A-2006-57044 ("JP-A" means unexamined published Japanese patent application) and JP-A-2006-328262). Besides, it is proposed to make pigments a solid solution in consideration of improving a coloring force and weather resistance (see JP-A-60-35055). Also disclosed is a method for preparing a pigment dispersion by dissolving an organic pigment and a polymer dispersant or a polymer compound as dispersant in an aprotic organic solvent in the presence of alkali and mixing the solution with water, as a build-up method in which pigment particles and others are made in a liquid-phase (see JP-A-2004-43776). Further, studies have been made of the predetermined polymer compounds per se and the like that are used in the above-described method (see JP-A-2003-26972 and JP-A-2006-342316). However in the build-up method of using a polymer compound as dispersant, it was difficult to dissolve both the pigment and the polymer compound in organic solvent favorably (cosolubilization) and yet to preserve favorable dispersibility of the pigment when the mixture was mixed with water. To solve the problem, a study for balanced cosolubilization and pigment dispersibility by designing a polymer compound having a special structure was carried out (see JP-A-2007-119586). However, further studies should be made for preparation of an industrially valuable high-stability dispersion containing nanometer-sized fine particles that has better general-purpose properties and higher efficient and is produced at low cost.

SUMMARY OF THE INVENTION

The present invention resides in a water-insoluble colorant dispersion prepared by a production method including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the following Formula (I) or (II), and a step of mixing the solution obtained in the above step with an aqueous medium; characterized by containing water-insoluble colorant fine particles, a polymer compound having one or more acid groups selected from the group consisting of carboxylic acid group, sulfonic acid group and phosphoric acid group as hydrophilic group, an aqueous medium, and a phase-transfer base represented by the following Formula (I) or (II):

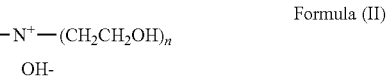

wherein $R_1$, $R_2$, $R_3$, $R_4$ and $R_5$ each independently represents a methyl group, an ethyl group, or a propyl group, n represents an integer of 1 to 4.

Further, the present invention resides in a method of producing a water-insoluble colorant dispersion, including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the following Formula (I) or (II), and a step of mixing the solution obtained in the above step with an aqueous medium, generating the water-insoluble colorant fine particles, and dispersing the fine particles;

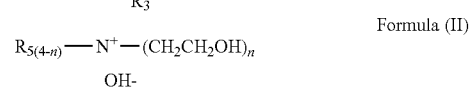

wherein $R_1$, $R_2$, $R_3$, $R_4$ and $R_5$ each independently represents a methyl group, an ethyl group, or a propyl group, n represents an integer of 1 to 4.

Further, the present invention resides in a recording liquid, ink set, image-forming method and image-forming apparatus using the above dispersion.

Other and further features and advantages of the invention will appear more fully from the following description.

DETAILED DESCRIPTION OF THE INVENTION

According to the present invention, there is provided the following means:

(1) A water-insoluble colorant dispersion prepared by a production method including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the following Formula (I) or (II), and a step of mixing the solution obtained in the above step with an aqueous medium; characterized by containing water-insoluble colorant fine particles, a polymer compound having one or more acid groups selected from the group consisting of carboxylic acid group, sulfonic acid group and phosphoric acid group as hydrophilic group, an aqueous medium, and a phase-transfer base represented by the following Formula (I) or (II):

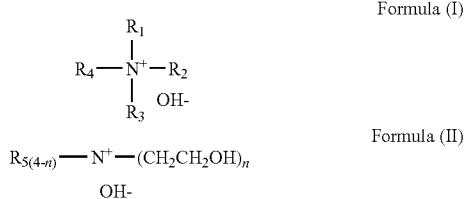

wherein $R_1$, $R_2$, $R_3$, $R_4$ and $R_5$ each independently represents a methyl group, an ethyl group, or a propyl group, n represents an integer of 1 to 4.

(2) The water-insoluble colorant dispersion according to the item (1), wherein the phase-transfer base has a negative ClogP value.

(3) The water-insoluble colorant dispersion according to the item (1) or (2), wherein the acid group is a carboxylic acid group.

(4) The water-insoluble colorant dispersion according to any one of the items (1) to (3), wherein the water-insoluble colorant is an organic pigment selected from the group consisting of quinacridone organic pigments, diketopyrrolopyrrole organic pigments, and monoazo yellow organic pigments.

(5) A method of producing a water-insoluble colorant dispersion, including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the following Formula (I) or (II), and a step of mixing the solution obtained in the above step with an aqueous medium, generating the water-insoluble colorant fine particles, and dispersing the fine particles;

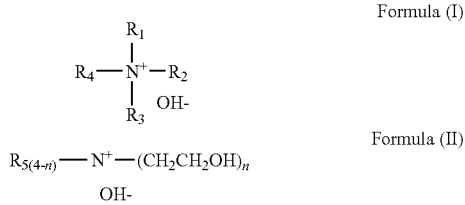

wherein $R_1$, $R_2$, $R_3$, $R_4$ and $R_5$ each independently represents a methyl group, an ethyl group, or a propyl group, n represents an integer of 1 to 4.

(6) The method of producing a water-insoluble colorant dispersion according to the item (5), further including a step of mixing the water-insoluble colorant dispersion with an organic acid and/or an inorganic acid to obtain aggregate of the water-insoluble colorant fine particles, and a step of redispersing the aggregate by mixing it with an aqueous medium for disintegration of the aggregated fine particles.

(7) The method of producing a water-insoluble colorant dispersion according to the item (6), wherein the phase-transfer base represented by Formula (I) or (II) is added to the mixture of the aggregate and the aqueous medium.

(8) A recording liquid produced by the dispersion according to any one of the items (1) to (4), wherein the water-insoluble colorant is contained in an amount of 0.1 to 15% by mass with respect to a total mass of the recording liquid.

(9) The recording liquid according to the item (8), wherein the recording liquid is an inkjet recording liquid.

(10) An ink set using the inkjet recording liquid according to the item (9).

(11) An image-forming method, comprising: a step of recording an image by providing, with a medium, the recording liquid according to the item (8) or (9), or the recording liquid by using the ink set according to the item (10).

(12) An image-forming apparatus having a means that can record an image by providing, with a medium, the recording liquid according to the item (8) or (9), or the recording liquid by using the ink set according to the item (10).

Hereinafter, the present invention is explained in detail.

The dispersion according to the present invention contains a polymer having one or more groups selected from the group consisting of carboxylic acid group, sulfonic acid group and phosphoric acid group as hydrophilic units. The polymer compound is preferably used as a dispersing agent for fine particles of water-insoluble colorant. Examples of the polymer compounds include block-copolymers, random copolymers, or graft copolymers, or modified materials of these copolymers and salts thereof, each of which is composed of at least two monomer components selected from styrene, vinylnaphthalene, aliphatic alcohol esters of α,β-ethylenycally unsaturated carboxylic acid, acrylic acid, methacrylic acid, maleic acid, alkenyl sulfonic acids, vinyl amines, allyl amines, itaconic acid, fumaric acid, vinyl acetate, vinyl phosphoric acid, vinyl pyrrolidone, acrylamide, N-vinyl acetoamide, N-vinylformamide, and derivative compounds thereof, with the proviso that at least one of the monomers has a functional group that becomes a carboxylic acid group, a sulfonic acid group, or a phosphoric acid group.

The acid group is more preferably carboxylic or sulfonic acid, and still more preferably carboxylic acid. The polymer compounds may be used alone or in combination of two or more. The acid value of the acid group-containing polymer is preferable in the range of 100 mg-KOH/g to 300 mg-KOH/g, more preferably in the range of 140 mg-KOH/g to 240 mg-KOH/g.

More specifically, the polymer compound according to the present invention preferably contains units (repeating units) having the acid group as hydrophilic groups and units (repeating units) having a hydrophobic group, and use of a copolymer obtained by copolymerization of a hydrophilic monomer component and a hydrophobic monomer component is preferable. It should be noted that the term "hydrophilic" means a good affinity with water and a high water solubility, whereas the "hydrophobic" means a poor affinity with water and a sparse water solubility.

The hydrophobic monomer component is, for example, a monomer component having, as its structural unit, a hydrophobic unit such as a long-chain alkyl group having 8 or more carbon atoms or a t-butyl group, phenyl group, biphenyl group or naphthyl group. For providing a water-insoluble colorant with high dispersion stability, monomer components containing block segments having a hydrophobic monomer such as styrene or stearyl methacrylamide as the repeating unit are preferable, but the hydrophobic monomer component is not limited thereto.

Examples of the hydrophilic monomer component include monomer components containing, as a structural unit, a hydrophilic unit having a functional group such as the aforementioned carboxylic acid group, sulfonic acid group, and phosphoric acid group. Specifically, examples of the hydrophilic monomer include acrylic acid or methacrylic acid; carboxylic acid salts such as inorganic salts or organic salts of acrylic acid. However, the hydrophilic monomer component is not limited to these materials.

For uniform dispersibility and further improvement in storage stability, the amount of the polymer compound having one or more acid groups selected from carboxylic acid group, sulfonic acid group or phosphoric acid group as hydrophilic group dissolved in solution together with the water-insoluble colorant described below is preferably in the range of 0.1 to 1,000 parts by mass, more preferably in the range of 1 to 500 parts by mass, and particularly preferably in the range of 10 to 250 parts by mass, with respect to 100 parts by mass of the water-insoluble colorant. Too small amount of the dispersing agent sometimes has no effect to improve dispersion stability of organic pigments fine particles. There is no particular limitation on an amount of the polymer compound that is contained in the dispersion of the present invention. However, it is practical to use the polymer compound in an amount of 10 parts by mass to 100 parts by mass, with respect to 100 parts by mass of water-insoluble colorant. The molecular weight of the polymer compound is not particularly limited, but is preferably in the range of 5,000 to 100,000, and more preferably from 10,000 to 50,000 in terms of the mass average molecular weight. It should be noted that when described simply as a molecular weight in the present invention, the molecular weight means a mass average molecular weight, and the mass average molecular weight, unless indicated otherwise, means an average molecular mass calculated in terms of polystyrene that is measured by gel permeation chromatography (carrier: tetrahydrofuran). It should be also noted that the term "dispersion" that is used in the present invention means a composition having prescribed fine particles dispersed therein. The form of the dispersion is not particularly limited. The dispersion is used as a meaning to embrace a liquid composition (dispersion liquid), a past-like composition, and a solid composition.

The state of the acid group-containing polymer compound contained in the dispersion is not particularly limited, and may be contained independently of other components or together with other components. Thus, in the "dispersion containing the water-insoluble colorant fine particles together with the polymer compound" of the present invention, the polymer compound may be contained in the water-insoluble colorant fine particles in the dispersion or separately with the fine particles in the dispersion. Accordingly, the state in which part of the polymer compound may be in dissociation equilibrium between adsorption on and release from the fine particles, is also included in the concept. The same is true for the components other than the acid group-containing polymer compound, such as the phase-transfer base described below.

The dispersion according to the present invention contains a phase-transfer base represented by Formula (I) or (II). In the Formula, $R_1$ to $R_5$ each represent a methyl group, an ethyl group or a propyl group (n-propyl group or isopropyl group), preferably a methyl group, an ethyl group or an n-propyl group, more preferably a methyl group or an ethyl group, and still more preferably a methyl group.

The phase-transfer base for use in the present invention preferably has a negative ClogP value, more preferably a negative value of lower than −2. The lower limit of the ClogP value is not particularly limited, but normally −6 or more. The ClogP value is the common logarithm of the 1-octanol/water distribution coefficient P, or the rate of equilibrium concentrations of a compound in 1-octanol and water. The ClogP value is defined as a value determined, for example by fragment approach, based on the chemical structure of the compound (A. Leo, Comprehensive Medical Chemistry, Vol. 4; C. Hansch, P. G. Sammens, J. B. Taylor and C. A. Ramden, Eds., p. 295, Pergramon Press, 1990) and calculated by the "CLOGP" program available from Daylight Chemical Information Systems.

The phase-transfer salt is preferably an ammonium compound, and more preferably choline hydroxide, tetramethylammonium hydroxide, tetraethylammonium hydroxide or tetrapropylammonium hydroxide.

The use rate of the phase-transfer base is not particularly limited, but, in the step of codissolving a water-insoluble colorant and a polymer compound having the acid groups as hydrophilic units in an organic solvent, for example when 100 parts by mass of the water-insoluble colorant and 50 parts by mass of the polymer compound having the acid group as hydrophilic unit are mixed, the molar ratio of the phase-transfer base to water-insoluble colorant is preferably 1.0 to 100 mol equivalent, more preferably 1.5 to 50 mol equivalent, and particularly preferably 2.0 to 20 mol equivalent.

As will be described below, the content of the phase-transfer base in the water-insoluble colorant dispersion, including the dispersion of the aggregate of water-insoluble colorant fine particles obtained from the water-insoluble colorant dispersion, is preferably 0.5 to 10 mol equivalent, more preferably 0.8 to 5 mol equivalent, and particularly preferably 0.9 to 1.5 mol equivalent, with respect to 1 mol equivalent of the acid group in the acid group-containing polymer compound.

In the present invention, the "base" is a compound that dissociates in a liquid such as water and releases an oxonium ion (OH—). However, the base may be present in the liquid in the state completely dissociated to the ion. The "base" generates a particular cation and an oxonium ion (anion) by dissociation in a water-containing liquid such as aqueous solution or aqueous dispersion. The water-containing liquid is considered to contain the "base", if the cation is detected even if the oxonium ion is not confirmed. The method of detecting and quantitative analyzing the base in the present invention is not particularly limited, but the structure can be identified for example by H-NMR analysis or liquid chromatography commonly used in identification of compound and the content can be determined by neutralization titration. In the present invention, used is a phase-transfer base facilitating transfer of the base between the water phase and the organic phase.

As described above, in the production method according to the present invention, the pigment may not be dissolved by using an inorganic base such as alkali metal or alkali-earth metal. It is thus possible to control or prevent contamination and corrosion, for example of the electrodes in device, by the metal ions remaining in dispersion when formed. For that reason, the metal ions are normally removed, but the operation requires quite tedious processing and operation. In contrast, the present invention can remove the inorganic base without need for such a complicated step and thus can be used favorably in precision devices or the like having a densely-installed electrode structure that are vulnerable to metal ions and the like.

However, an alkali other than the bases represented by Formula (I) may be added additionally as the alkaline compound to be contained in the aprotic water-soluble organic solvent, and examples thereof include the following alkaline compounds: inorganic bases such as sodium hydroxide, potassium hydroxide, cesium hydroxide, lithium hydroxide, magnesium hydroxide, calcium hydroxide and barium hydroxide; organic bases such as trialkylamines and diazabicycloundecene (DBU); metal alkoxides such as sodium methoxide, sodium tert-butoxide and potassium tert-butoxide, and the like.

The phase-transfer base according to the present invention preferably has a counter base skeleton amphipathic to both aqueous and organic phases. Use of such a phase-transfer base is significantly effective in accelerating redispersion of the aggregate, for example in the step of redispersing the aggregate, compared to dispersion with a common metal alkali. It is probably because the base in the aqueous layer becomes more penetrable into the aggregation layer containing the polymer compound having one or more acid groups selected from carboxylic acid group, sulfonic acid group and phosphoric acid group as hydrophilic units because of the phase-transfer promoting action of the counter cation. In other words, the co-solubilization of the water-insoluble colorant and the polymer compound in the aqueous layer/organic layer seems to be increased.

The organic pigment usable for the water-insoluble colorants in the dispersion of the present invention is not limited in hue and structure thereof. Specifically, examples thereof include perylene-compound pigments, perynone-compound pigments, quinacridone-compound pigments, quinacridonequinone-compound pigments, anthraquinone-compound pigments, anthanthorone-compound pigments, benzimidazolone-compound pigments, condensed disazo-compound pigments, disazo-compound pigments, azo-compound pigments, indanthrone-compound pigments, indanthrene-compound pigments, quinophthalone-compound pigments, quinoxalinedione-compound pigments, metal-complex azo-compound pigments, phthalocyanine-compound pigments, triarylcarbonium-compound pigments, dioxazine-compound pigments, aminoanthraquinone-compound pigments, diketopyrrolopyrrole-compound pigments, naphthol AS compound pigments, thioindigo-compound pigments, isoindoline-compound pigments, isoindolinone-compound pigments, pyranthrone-compound pigments, isoviolanthrone-compound pigments, and mixtures of any two or more thereof.

More specifically, examples of the organic pigment include perylene-compound pigments, such as C.I. Pigment Red 179, C.I. Pigment Red 190, C.I. Pigment Red 224, C.I. Pigment Violet 29, or the like; perynone-compound pigments, such as C.I. Pigment Orange 43, C.I. Pigment Red 194 or the like; quinacridone-compound pigments, such as C.I. Pigment Violet 19, C.I. Pigment Violet 42, C.I. Pigment Red 122, C.I. Pigment Red 192, C.I. Pigment Red 202, C.I. Pigment Red 207, C.I. Pigment Red 209 or the like; quinacridonequinone-compound pigments, such as C.I. Pigment Red 206, C.I. Pigment Orange 48, C.I. Pigment Orange 49, or the like; anthraquinone-compound pigments, such as C.I. Pigment Yellow 147 or the like; anthanthrone-compound pigments, such as C.I. Pigment Red 168 or the like; benzimidazolone-compound pigments, such as C.I. Pigment Brown 25, C.I. Pigment Violet 32, C.I. Pigment Yellow 180, C.I. Pigment Yellow 181, C.I. Pigment Orange 36, C.I. Pigment Orange 62, C.I. Pigment Red 185, or the like; condensed disazo-compound pigments, such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144 (C.I. Number: 20735), C.I. Pigment Red 166, C.I. Pigment Yellow 219, C.I. Pigment Red 220, C.I. Pigment Red 221, C.I. Pigment Red 242, C.I. Pigment Red 248, C.I. Pigment Red 262, C.I. Pigment Brown 23, or the like; disazo-compound pigments, such as C.I. Pigment Yellow 13, C.I. Pigment Yellow 83, C.I. Pigment Yellow 188, or the like; azo-compound pigments, such as C.I. Pigment Red 187, C.I. Pigment Red 170, C.I. Pigment Yellow 74, C.I. Pigment Red 48, C.I. Pigment Red 53, C.I. Pigment Orange 64, C.I. Pigment Red 247, or the like; indanthrone (indanthrene)-compound pigments, such as C.I. Pigment Blue 60, or the like; quinophthalone-compound pigments, such as C.I. Pigment Yellow 138, or the like; quinoxalinedione-compound pigments, such as C.I. Pigment Yellow 213, or the like; metal-complex azo-compound pigments, such as C.I. Pigment Yellow 129, C.I. Pigment Yellow 150, or the like; phthalocyanine-compound pigments, such as C.I. Pigment Green 7, C.I. Pigment Green 36, C.I. Pigment Green 37, C.I. Pigment Blue 16, C.I. Pigment Blue 75, C.I. Pigment Blue 15 (including 15:1, 15:6 or the like), or the like; triaryl carbonium-compound pigments, such as C.I. Pigment Blue 56, C.I. Pigment Blue 61, or the like; dioxazine-compound pigments, such as C.I. Pigment Violet 23, C.I. Pigment Violet 37, or the like; aminoanthraquinone-compound pigments, such as C.I. Pigment Red 177, or the like; diketopyrrolopyrrole-compound pigments, such as C.I. Pigment Red 254, C.I. Pigment Red 255, C.I. Pigment Red 264, C.I. Pigment Red 272, C.I. Pigment Orange 71, C.I. Pigment Orange 73, or the like; naphthol AS compound pigments, such as C.I. Pigment Red 187, C.I. Pigment Red 170, or the like; thioindigo-compound pigments, such as C.I. Pigment Red 88, or the like; isoindoline-compound pigments, such as C.I. Pigment Yellow 139, C.I. Pigment Orange 66, or the like; isoindolinone-compound pigments, such as C.I. Pigment Yellow 109, C.I. Pigment Yellow 110, C.I. Pigment Orange 61, or the like; pyranthrone-compound pigments, such as C.I. Pigment Orange 40, C.I. Pigment Red 216, or the like; or isoviolanthrone-compound pigments, such as C. Pigment Violet 31, or the like.

In particular, the water-insoluble colorant is preferably a quinacridone organic pigment, a diketopyrrolopyrrole organic pigment or a monoazo yellow organic pigment.

The content of the water-insoluble colorant in the dispersion according to the present invention is not particularly limited, but preferably for example 0.01 to 30 mass %, more preferably 1.0 to 20 mass % and particularly preferably 1.1 to 15 mass %, when application as ink is considered.

The dispersion according to the present invention may be kept less viscous, even when it is highly concentrated. For example, when used as a recording liquid, the dispersion, if it is less viscous even if it is highly concentrated, allows expansion in the degree of freedom of selecting the kind and the addition amount of the additive used in the recording liquid, and thus, the dispersion according to the present invention can be used favorably as recording liquid.

The water-insoluble colorant dispersion according to the present invention is produced favorably by the production method according to the present invention including a step of codissolving a water-insoluble colorant and a polymer compound having one or more acid groups selected from carboxylic acid group, sulfonic acid group and phosphoric acid group as hydrophilic group in an organic solvent in the presence of the phase-transfer base represented by Formula (I) or (II), and a step of mixing the solution obtained in the above step with an aqueous medium, generating the water-insoluble colorant fine particles, and dispersing the fine particles.

The organic solvent for use in the production method according to the present invention may be any solvent, either an aprotic or protic organic solvent. However, the organic solvent dissolving the water-insoluble colorant and the polymer compound in the presence of an alkali is preferably an aprotic organic solvent, more preferably dimethylsulfoxide, N-methylpyrrolidone, dimethylformamide, dimethylacetamide, sulfolane, or the like. In addition, these organic solvents may be used alone or in combination of two or more.

The content of the organic solvent in the dispersion according to the present invention is not particularly limited, but preferably in the range of 2 to 500 parts by mass, more preferably in the range of 5 to 100 parts by mass, with respect to 1 part by mass of the pigment, for more favorable solubilization state of the water-insoluble colorant.

The step of obtaining the water-insoluble colorant aggregate, in which addition of an organic solvent is effective in improving filtration, is a useful process. Any kind of solvent, either an aprotic or protic organic solvent, may be used favorably as the solvent, and a typical example thereof is a polar solvent such as ethyl acetate, ethyl lactate, acetone, methyl ethyl ketone, acetonitrile, methanol, ethanol or isopropanol. The amount thereof used is also not particularly limited, but preferably in the range of 1 to 100 parts by mass, more preferably in the range of 5 to 50 parts by mass, with respect to 100 parts by mass of the water-insoluble colorant dispersion.

In the method of producing a water-insoluble colorant dispersion according to the present invention, the solution containing the water-insoluble colorant and others and an aqueous medium are mixed with each other. In the present invention, the aqueous medium is water alone or a mixed solvent of water and a water-soluble organic solvent. The organic solvent is preferably added, when water alone is insufficient for keeping the pigment and the dispersant in uniform dispersion state or for acceleration of the aggregate dispersion step with a base. The organic solvent used is not particularly limited. Specific examples of the organic solvent include lower alcohols such as methanol, ethanol, n-propanol, isopropanol, n-butanol, isobutanol, and tert-butanol; aliphatic ketones such as acetone, methyl ethyl ketone, methyl isobutyl ketone, and diacetone alcohol; ethylene glycol, diethylene glycol, triethylene glycol, glycerol, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, N-methylpyrrolidone, 2-pyrrolidone, N,N-dimethylformamide, dimethylimidazolidinone, dimethylsulfoxide, and N,N-dimethylacetamide. These solvents may be used singly or in a combination of two or more thereof. The amount of water in the water-insoluble colorant dispersion is preferably adjusted to 99 to 20 mass %, more preferably to 95 to 30 mass %. The content of the organic solvent in the pigment dispersion is preferably in the range of 50 to 0.1% by mass, and more preferably from 30 to 0.05% by mass, of the aqueous dispersion.

In the production method according to the present invention, the water-insoluble colorant is dissolved together with the polymer compound having one or more kinds of acid groups selected from carboxylic acid group, sulfonic acid group and phosphoric acid group as hydrophilic group in an organic solvent. In addition, the organic solvent may contain at least one of additives such as crystal growth inhibitors, ultraviolet absorbents, antioxidants, resin additives and surfactants, as needed.

Examples of the crystal growth inhibitors include those commonly used in the art such as phthalocyanine derivatives and quinacridone derivatives, and typical examples thereof include phthalocyanine phthalimidomethyl derivatives, phthalocyanine sulfonic acid derivatives, phthalocyanine N-(dialkylamino)methyl derivatives, phthalocyanine N-(dialkylaminoalkyl)sulfonic amide derivatives, quinacridone phthalimidomethyl derivatives, quinacridone sulfonic acid derivatives, quinacridone N-(dialkylamino)methyl derivatives, quinacridone N-(dialkylaminoalkyl)sulfonic amide derivatives and the like.

Examples of the ultraviolet absorbents include metal oxides, aminobenzoate-based ultraviolet absorbents, salicylate-based ultraviolet absorbents, benzophenone-based ultraviolet absorbents, benzotriazole-based ultraviolet absorbents, cinnamate-based ultraviolet absorbents, nickel chelate-based ultraviolet absorbents, hindered amine-based ultraviolet absorbents, urocanic acid-based ultraviolet absorbents, vitamin-based ultraviolet absorbents, and the like.

Examples of the antioxidants include hindered phenol compounds, thioalkanoate ester compounds, organic phosphorus compounds, aromatic amines and the like.

Examples of the resin additives include anion-modified polyvinyl alcohols, cation-modified polyvinyl alcohols, polyurethanes, carboxymethylcellulose, polyesters, polyallylamines, polyvinylpyrrolidones, polyethyleneimines, polyamine sulfones, polyvinylamines, hydroxyethyl cellulose, hydroxypropyl cellulose, melamine resins or the modified synthetic resins thereof, and the like.

All of these crystal growth inhibitors, ultraviolet absorbents, and resin additives can be used alone or in combination of two or more thereof.

Specifically, the surfactant that can be used in the present invention may be properly selected from previously known surfactants and derivatives thereof, including anionic surfactants such as alkylbenzene sulfonates, alkylnaphthalene sulfonates, higher fatty acid salts, sulfonates of higher fatty acid esters, sulfates of higher alcohol ether, sulfonates of higher alcohol ether, alkylcarboxylates of higher alkylsulfonamide, and alkylphosphorates; nonionic surfactants such as polyoxyethylene alkylethers, polyoxyethylene alkylphenylethers, polyoxyethylene fatty acid esters, sorbitan fatty acid esters, ethyleneoxide adducts of acetylene glycol, ethyleneoxide adducts of glycerol, and polyoxyethylene sorbitan fatty acid esters; and in addition to the above, amphoteric surfactants such as alkyl betaines and amido betaines; and silicone-based surfactants and fluorine-based surfactants.

In the production method according to the present invention, water-insoluble colorant fine particles are generated by mixing a solution obtained by codissolving the water-insoluble colorant and the polymer compound having one or more kinds of acid groups selected from carboxylic acid group, sulfonic acid group and phosphoric acid group as hydrophilic group in an organic solvent in the presence of a phase-transfer base (hereinafter, the solution will be referred to as "water-insoluble colorant solution") with aqueous medium. The rate of the water used then is preferably 0.5 to 1,000 parts by mass, more preferably 1 to 100 parts by mass, with respect to 1 part by mass of the water-insoluble colorant solution, for improvement in the dispersion stability of fine particles and for further improvement in the color density of the dispersion.

In the production method according to the present invention, the temperature when the water-insoluble colorant pigment solution is mixed with the aqueous medium is preferably in the range of −50° C. to 100° C., more preferably in the range of −20° C. to 50° C. The temperature of the solution during mixing often influences the particle size of the resulting water-insoluble colorant fine particles significantly, and the liquid temperature is preferably adjusted in the range of −50° C. to 100° C. for controlled production of a dispersion containing nanometer-sized fine particles. In addition, a known freezing point-lowering agent such as ethylene glycol, propylene glycol or glycerol may be added then to the mixing water for assuring favorable liquid fluidity.

The water-insoluble colorant solution and the aqueous medium are preferably mixed as rapidly as possible, for production of uniformly sized nanometer-sized fine particles. Any apparatus used for agitation, mixing, dispersion and crystallization, such as ultrasonic wave oscillator, full-zone agitating blade, internal-circulation agitating apparatus, external-circulation agitating apparatus, flow-rate and ion-concentration controlling unit or the like, may be used. Alternatively, they may be mixed in continuously flowing water. Addition of the water-insoluble colorant solution into the aqueous medium may be done by any liquid injection method commonly used, but it is preferably added into water or downward onto water in the form of the liquid ejected from a nozzle such as of syringe, needle or tube. Multiple nozzles may be used for injection in a shorter period of time. Additives such as alkali and dispersant may be added to the aqueous medium to be mixed with the water-insoluble colorant solution, for reliable preparation of the aqueous dispersion of water-insoluble colorant fine particles.

Water-insoluble colorants such as pigments dissolved in an organic solvent are considered to show rapid crystal growth or give amorphous aggregate when mixed with an aqueous medium. However, in the present invention, because the water-insoluble colorant and the acid group-containing polymer compound are copresent as codissolved therein, the fine particles generated during or immediately after mixing of the solution with the aqueous medium are not impaired the dispersion stability. It is possible then to adjust the crystal form and the aggregation state of the fine particles in dispersion by heat treatment.

The aqueous water-insoluble colorant dispersion according to the present invention can be used, as it is or after adjustment of its colorant concentration as needed, in various applications, for example as an inkjet ink. An aqueous dispersion is sometimes lower in colorant concentration for application as inkjet ink. Although it is possible to increase the concentration by condensation of the dispersion medium in the dispersion, the method is unpractical industrially. In contrast, the water-insoluble fine particles in the dispersion according to the present invention can be separated as a powder or paste, modified for improvement in redispersion efficiency in water, and then redispersed efficiently in an aqueous medium. It is thus possible to prepare an aqueous dispersion having a desired colorant concentration efficiently.

In the production method according to the present invention, it is preferable to form the aggregate of the water-insoluble colorant fine particles contained in the dispersion, by using aqueous water-insoluble colorant dispersion obtained in the aforementioned step. The "water-insoluble colorant fine particles" in the present invention include fine particles consisting only of a water-insoluble colorant and also fine particles containing a water-insoluble colorant and other components. For example, the fine particle may have a core particle of a water-insoluble colorant and/or other compounds and a sheath of the dispersant (polymer compound, surfactant, or the like) covering the same as it is adsorbed thereon. In particular in the dispersion according to the present invention, the acid group-containing polymer compound preferably covers the water-insoluble colorant fine particle as it is adsorbed thereon. The coated adsorption state can be confirmed, for example, by particle structure analysis by X-ray crystallographic analysis (XRD) or solid-state NMR analysis.

For example, processing by addition of an organic acid or an inorganic acid is used favorably for aggregation of the water-insoluble colorant fine particles. The acid treatment preferably includes a step of aggregating water-insoluble colorant fine particles with an acid, separating the aggregate from the solvent (dispersion medium), concentrating it, removing the solvent therefrom and demineralizing (deacidifying) the resulting aggregate. Acidification of the system leads to reduction of the electrostatic repulsive force in the acidic hydrophilic region, which in turn leads to aggregation of the water-insoluble colorant fine particles. Generally, acidification of a pigment dispersion into aggregation and subsequent alkali treatment of the aggregate may not lead to redispersion of the pigment fine particles, only showing increase in primary particle diameter. In contrast, in the production method for the dispersion according to the present invention, it is possible to reduce the increase in primary particle diameter significantly, when an aqueous dispersion of the water-insoluble colorant fine particles such as of pigment is first prepared and acidified to produce aggregate and then the aggregate is redispersed.

In the present invention, the water-insoluble colorant dispersion obtained may be heat-treated. It leads to improved crystallinity of the water-insoluble colorant and thus to improvement in the weather resistance of the image prepared by using the ink obtained from the dispersion. The heat treatment, which may also lead to significant improvement in filtration efficiency, is thus a useful process. The temperature of the heat treatment is preferably 40 to 100° C., more preferably 40 to 80° C. and most preferably 50 to 80° C. The heating time is preferably 10 minutes to 3 days, more preferably 1 hour to 1 day, and still more preferably 2 to 12 hours.

The acid used for aggregation of the water-insoluble colorant fine particles preferably converts the pigment-containing particles in the aqueous dispersion, which are fine particles resistant to precipitation, into aggregate in a form such as slurry, paste, powder-like, granular, cake-like (bulk), sheet-like, short fiber-like, or flake-like form that can be separated from the solvent efficiently by a common separation method. More preferably, for simultaneous separation of the alkali and the solvent used in the step of dissolving the water-insoluble colorant, an acid forming a water-soluble salt with the used alkali such as phase-transfer base is favorably used, and the acid itself is also preferably highly soluble in water. In order to conduct desalting as efficiently as possible, it is preferable that the amount of acid used is as small as possible so long as the aqueous dispersion of the pigment particles aggregate in the amount of the acid. Examples of the acid include hydrochloric acid, sulfuric acid, nitric acid, acetic acid, phosphoric acid, trifluoroacetic acid, dichloroacetic acid, and methane sulfonic acid. Of these acids, hydrochloric acid, acetic acid, and sulfuric acid are particularly preferable. An aqueous dispersion of water-insoluble colorant particles that has been processed with the acid so as to be easily separable can be easily separated by using a centrifugal separator, a filter, a slurry liquid-solid separator or the like. At this time, a degree of desalting or solvent removal can be controlled by adding diluent water, or by increasing frequency of decantation and washing.

The aggregate thus obtained may be used as a high-water-content paste or slurry or alternatively, as a fine powder after drying as needed for example by spray drying, centrifugation drying, filtration drying or freeze drying.

In a favorable embodiment of the production method according to the present invention, it is preferable to make the fine particles redispersible by adding an aqueous medium to the aggregate prepared from the aqueous dispersion and to treat the dispersion with an alkali then. Specifically, in the step including alkali treatment, it is possible for example to treat the water-insoluble colorant fine particles aggregated with an acid, by using an alkali in the step of forming aggregate, making the aggregate adsorbed on the fine particles and thus neutralizing the copresent acid group-containing polymer compound, making it function as a dispersant and redispersing the water-insoluble colorant in the aqueous medium effectively.

In the preferable embodiment of the production method according to the present invention, because demineralization and solvent removal is complete in the step of forming aggregate, it is possible to obtain a conc-base containing smaller amounts of impurities for preparation of an aqueous dispersion of water-insoluble colorant fine particles for example of a pigment. The alkali used in the redispersion step may be any alkali, if it serves as a neutralizing agent to the dispersant having an acidic hydrophilic region and makes the dispersant more soluble in water. The "alkali", as used herein, is identical with the "base" described above. Typical examples of the alkalis include alkali metal hydroxides such as sodium hydroxide, lithium hydroxide, and potassium hydroxide; ammonia and various organic amines such as aminomethylpropanol, dimethylaminopropanol, dimethylethanolamine, diethyltriamine, monoethanolamine, diethanolamine, triethanolamine, butyldiethanolamine and morpholine, and the phase-transfer bases described above. More specific examples thereof include ammonium compounds represented by Formula (I) or (II); and more preferable are choline hydroxide, tetramethylammonium hydroxide, tetraethylammonium hydroxide and the like. These alkalis may be used alone or in combination of two or more.

The amount of the alkali used is not particularly limited, if it is in a range allowing reliable redispersion of the aggregated particles in water, but preferably an amount making the pH of the dispersion in the range of 6 to 12, more preferably an amount making the pH of the dispersion in the range of 7 to 11, because the dispersion otherwise may cause corrosion of various members if used in applications as a printing ink and an inkjet printer ink.

Agitating, mixing and dispersing apparatuses may be used as needed in the step of redispersing the aggregated water-insoluble colorant particles in an aqueous medium. When a paste or slurry of water-insoluble colorants which is high in water content is used, addition of water is unnecessary. Further, heating, cooling, distillation or the like may be conducted for the purpose of enhancing efficiency of re-dispersion and another purpose of removing unnecessary water-soluble organic solvent, or an excessive alkali or the like.

The recording liquid of the present invention may be prepared by using the above dispersion of the present invention, and mixing the dispersion with each of prescribed components such as a polymer compound, a surfactant and an aqueous solvent, and then uniformly dissolving or dispersing them. It is preferable that the recording liquid of the present invention contains the above water-insoluble colorant in an amount of 0.1% by mass to 15% by mass of the recording liquid. When an excessive amount of polymer compounds or other additives are contained in the prepared ink, these materials may be properly removed according to a method such as centrifugal separation and dialysis, thereby to re-prepare the ink composition. The recording liquid of the present invention may be used alone. Alternatively, the recording liquid may be combined with another ink to prepare an ink set of the present invention.

The recording liquid of the present invention may be used in various image-forming methods and apparatuses, such as a variety of printing methods, inkjet process, and electrophotography. Imaging can be performed according to an image-forming method using the apparatuses. Further, according to the inkjet process, fine patterns may be formed, or dosage of drugs may be conducted.

It is preferable that the recording liquid of the present invention is used as an inkjet recording liquid. It is also preferred to prepare an ink set using the inkjet recording liquid. It is also preferred to prepare a printed article having an image recorded by use of the recording liquid or the ink set of the present invention and tools that can provide the recording liquid with a recording medium. It is more preferred to prepare a printed article having an image with a shading nuance adjusted by the means that has a function to adjust an applying amount or concentration of the recording liquid. It is also preferable that the recording liquid or ink set is used in an image-forming method that includes a process of recording an image by providing the recording liquid with a medium. Further, according to the present invention, it is also possible to produce an image-forming apparatus having the means for recording an image by using the above recording liquid or ink set and providing the recording liquid with a medium.

When the dispersion of the present invention, which has such excellent properties as described above, is applied to an ink, it is possible to achieve the image-recording with a high density and detail equivalent to the current off-set printing, or letter press printing that reproduce a color tone shading nuance by an area proportion (area gradation) as an example.

[Average Particle Diameter from Observation by Transmission Electron Microscope]

In the present invention, the average diameter of the water-insoluble colorant contained in the dispersion can be determined by observing the shapes of the primary particles formed when the water-insoluble colorant solution and the aqueous medium are mixed under transmission electron microscope (TEM) and calculating according to the following way. The dispersion (dispersion liquid) containing fine particles of water-insoluble colorant is diluted. The diluted dispersion is dropped onto a Cu 200 mesh to which a carbon film is attached, and then the fine particles are dried on the mesh. The diameter of each of 300 particles is measured from images of the particles photographed to 100,000 times using TEM (1200EX, trade name, manufactured by JEOL Ltd.), and then an average particle diameter is calculated. At this time, because the dispersion is dried on the Cu 200 mesh as described above, even the water-insoluble colorant is in a state well dispersed in the dispersion, there is a case where particles of the water-insoluble colorant apparently aggregate during the dry step, which makes it difficult to discriminate an accurate particle size. In this case, an average particle diameter is calculated by using isolated 300 particles that are not piled on other particles. When the particles of the water-insoluble colorant are not spherical, the width of the particle cross section (the longest size of the particle) is measured.

In one embodiment of the present invention, an average particle size of the water-insoluble colorant is from 5 nm to 50 nm. Especially, the average particle size of the water-insoluble colorant that is calculated from observation by using the transmission electron microscope (TEM) is preferably from 5 nm to 50 nm, and more preferably from 10 nm to 45 nm. It is especially preferable that the average particle size is from 15 nm to 40 nm from a viewpoint of transparency of the dispersion and compatibility of dispersion stability and resistance to light in the dispersion. When the average particle size is too small, it is sometimes difficult to keep a stable dispersion state in the dispersion for a long time, or it is sometimes difficult to obtain excellent resistance to light. On the other hand, when the average particle size is too large, it is sometimes difficult to obtain good transparency of the dispersion. In the present invention, the water-insoluble colorant that contains two or more kinds of pigments may consist of pigments, or may contain additional compounds other than the pigments. At this time, it is preferable that the particles of the water-insoluble colorant are composed of a solid solution of two or more kinds of pigments. However, a mixture of a portion having a crystalline structure and another portion having a non-crystalline structure may be present in the particle. Further, as described above, the particle may be composed of a core to which the above dispersing agent (a polymer compound, a surfactant or the like) is adhered so as to cover the core therewith, a component of the core being pigments or a mixture of the pigments and another compound.

The water-insoluble colorant that is used in the present invention may be contained in resin fine particles or inorganic fine particles. At this time, it is preferable that the resin fine particles and inorganic fine particles are a non-colored component in order not to degrade a tint of the water-insoluble colorant. An average particle size of the resin fine particles or the inorganic fine particles is preferably from 6 nm to 200 nm. When the dispersion of the water-insoluble colorant is used as an inkjet recording liquid, the average particle size is more preferably from 6 nm to 150 nm, and especially preferably from 6 nm to 100 nm, from a viewpoint of obtaining excellent discharge (emission) stability.

[Average Particle Diameter According to a Dynamic Light-Scattering Method]

In the present invention, a dispersion state of the water-insoluble colorant may be also evaluated according to a dynamic light-scattering method. Thereby, an average particle diameter of the water-insoluble colorant can be calculated. The principle of evaluation is detailed below. Particles with the size ranging from about 1 nm to about 5 μm are momentarily changing their position and direction in Brownian motion such as translation and rotation. Accordingly, by irradiating a laser light to these particles and then detecting the resultant scattered light, fluctuation of the scattered light intensity depending on Brownian motion is observed. By observing the fluctuation of the scattered light intensity with respect to time, a speed (diffusion coefficient) of the particles in Brownian motion is calculated and the size of the particles can be known.

Applying the above principle, an average particle diameter (hereinafter, volume average particle diameter will be referred to as "average particle diameter") of the water-insoluble colorant is measured. When the measured value is similar to the average particle diameter that is obtained from the TEM observation, it means that the particles in a liquid are in mono dispersion (the situation in which particles are neither bonding nor aggregating to each other). Fluctuation in the value means some of the primary particles of the water-insoluble colorant are present in the secondary particle state (aggregation state).

Thus, the combination of TEM observation of the primary particle diameter and measurement of secondary particles by dynamic light-scattering method allows estimation of the dispersion state of the water-insoluble colorant.

It was found in the present invention, that the arithmetic average particle diameter of the water-insoluble colorant in dispersion medium, as determined by dynamic light-scattering method, was similar to or not so separated from the average diameter obtained by TEM observation. In other words, it has been confirmed that a mono dispersion of the water-insoluble colorant in a dispersion medium according to the present invention can be attained. The arithmetic average particle size of the water-insoluble colorant in the dispersion medium according to the dynamic light-scattering method is preferably 60 nm or less, and more preferably 50 nm or less, and especially preferably 45 nm or less. The lowest limit value of the arithmetic average particle size is not particularly restricted, but it is normally 20 nm or more. Thus, a preferable range of the arithmetic average particle size is not substantially different from that obtained from TEM observation. In the present invention, unless indicated otherwise, the simply described "average particle diameter" means the average diameter determined by TEM.

It should be noted that even though the water-insoluble colorant in a dispersion medium is completely in a monodispersion, error of measurement or the like sometimes causes a difference between the average particle size according to the dynamic light-scattering method and the average particle size from TEM observation. For example, it is necessary that a concentration of a liquid to be measured is suitable for both the performance of the measurement apparatus and the method of detecting scattered light. Accordingly, error occurs unless a liquid to be measured has a concentration enough to secure a sufficient amount of transmission of light. Further, when nano-sized particles are measured, the obtained signal intensities are so feeble that they are strongly affected by dust, which causes errors. Therefore, it is necessary to take care of pre-treatment of the sample and purity of environment for measurement. When nano-sized particles are measured, a laser light source having a transmission output of 100 mV or more is suitable for enhancing intensities of scattered light.

Further, it is preferable that a particle size distribution of the water-insoluble colorant in a dispersion medium according to the present invention is monodispersion. Monodisperse particles are advantageous because adverse influence owing to light-scatting at large-sized particles can be reduced. In addition, when aggregate is formed by using the dispersion at printing, recording, or the like, the mono dispersion has advantages to control of a filling form of the formed aggregate or the like. As an indicator that is used to evaluate dispersity of the dispersion, for example, there can be used a difference between the diameter (D90) of particles that occupy 90% by number and the diameter (D10) of particles that occupy 10% by number of the total particle numbers, in the following integral equation of the particle diameter distribution function with respect to the arithmetic average particle diameter that is obtained according to the dynamic light-scattering method:

$$dG = f(D) \times d(D)$$

where, G represents the number of particles; and D represents a primary particle size.

In the present invention, the above difference between the size (D90) and the size (D10) is preferably 45 nm or less, and more preferably from 1 nm to 30 nm, and especially preferably from 1 nm to 20 nm. It should be noted that the above method can be suitably used in the particle diameter distribution curve that is prepared by using the particle diameter that is obtained from observation by using a transmission electron microscope.

Further, as another indicator that is used to evaluate dispersity, there can be also used a ratio (Mv/Mn) of a volume average particle size (Mv) to a number average particle size (Mn). Both Mv and Mn are obtained by the dynamic light-scattering method. In the dispersion of the present invention, the aforementioned ratio (Mv/Mn) of the water-insoluble colorant is preferably 1.5 or less, and more preferably 1.4 or less, and still more preferably 1.3 or less.

In the present invention, it is possible to establish high solubility for example in organic solvent and cosolubilization with a pigment at the same time by bringing a polymer compound having a particular acid group as hydrophilic unit into contact with a phase-transfer base and to improve the dispersion stability of the dispersion containing water-insoluble colorant fine particles prepared by using the same. In the present invention, it is possible by using the phase-transfer base in production of a higher-concentration dispersion by redispersing the aggregate of the water-insoluble colorant fine particles to reduce both particle dispersibility and viscosity and produce a pigment dispersion superior in temporal stability.

The dispersion according to the present invention contains a water-insoluble colorant such as pigment as fine particles having a uniform particle diameter, it can give an ink improved in storage life, discharging efficiency, transparency, and glossiness. The dispersion according to the present invention has a favorable operational advantage that the dispersion is highly stable because aggregation of the water-insoluble colorant fine particles is prohibited or the fine particles are present in a soft aggregation state redispersible under mild condition even though they are pulverized to the nanometer size. It is also possible according to the production method according to the present invention to prepare a dispersion having the favorable properties described above efficiently and at high purity, by using a favorable solution containing a water-insoluble colorant and a polymer compound without any sediment or the like.

In addition, the dispersion according to the present invention can be produced without depending on a special polymer compound that is not easily available and synthesized. Therefore, this can expand the width of choice in selecting the combination of a water-insoluble colorant and a polymer compound containing a particular acid group, and thus allows expansion of the versatility and also increases the stability of the dispersion containing the same. Further, the water-insoluble colorant fine particles dispersion according to the present invention, which is superior in storage stability, can be stored for an extended period of time, allows stabilized storage of the recording liquid and the ink set prepared by using the same, and improves the printing accuracy of the printed article, the image-forming method and the image-forming apparatus.

The present invention will be described in more detail based on the following examples, but the invention is not intended to be limited thereto. In the following examples, the terms "part(s)" and "%" are values by mass, unless otherwise specified. The average particle diameter of each dispersion was determined by dynamic scattering method by using LB-500 dynamic light-scattering analyzer (trade name, manufactured by HORIBA Ltd.), after the dispersion was diluted with ion-exchanged water. At this time, in addition to a volume-average particle size Mv of each of the dispersions, a number-average particle size Mn thereof is measured. Further, evaluation of the average particle size from observation of the transmission electron microscope (TEM) was conducted by dropping a diluted dispersion onto a Cu 200 mesh to which a carbon film is attached, and then dried, and thereafter measuring the size (width of particle cross section) of each of 300 particles that are isolated and not piled, from images of the particles photographed to 100,000 times using TEM (1200EX, trade name, manufactured by JEOL Ltd.), thereby calculating an average value as an average particle size. Hereinafter, the average particle size calculated from TEM observation is described as a TEM average particle diameter.

EXAMPLES

Example 1

13.2 parts by mass (g) of C.I. Pigment Red 122, 6.6 parts by mass (g) of the following acid group-containing polymer A (styrene/methacrylic acid copolymer, acid value: 180 mg-KOH/g, Mw=18,000), 140 parts by mass (g) of dimethylsulfoxide, and 39 parts by mass (g) of tetramethylammonium hydroxide (cosolubilization base, 25% methanol solution, manufactured by Alfa Aesar) were mixed; and the mixture was heated to 60° C. and agitated for 2 hours, to give a dark blue purple pigment solution containing the pigment and the styrene/methacrylic acid copolymer.

The pigment solution was subjected to ultrasonic treatment and fed by a feed pump into 2,000 ml of ion-exchanged water stirred by a stirrer (at a water temperature 12° C. in ice bath) rapidly at a rate of 100 ml/minute, to give a red-tinted pigment dispersion 1. The volume average particle diameter of the pigment dispersion, as determined by dynamic light-scattering method, was 150.4 nm (TEM average particle diameter: 27.3 nm). However, the particles are in the kinetically formed loose aggregation (soft aggregation) state, and the volume-average particle diameter could be reduced to 45.8 nm, by further processing with an ultrasonic wave homogenizer or after storage for a month. Also in the dispersions obtained in following Examples 2 to 10, the pigment fine particles were not aggregated or dispersed in the soft aggregation state.

Comparative Example 1

13.2 parts by mass (g) of C.I. Pigment Red 122, 6.6 parts by mass (g) of the following acid group-containing polymer A (styrene/methacrylic acid copolymer, acid value: 180 mg-KOH/g, Mw=18,000), and 160 parts by mass (g) of dimethylsulfoxide were mixed, to give a suspension. Then, 28% sodium methoxide methanol solution (manufactured by Wako Pure Chemical Industries) was added in small portions for stabilization of the pigment. However, the pigment (PR-122) was soluble, but the styrene/methacrylic acid copolymer remained undissolved, prohibiting sufficient cosolubilization. 28% sodium methoxide methanol solution was added to a solution of the styrene/methacrylic acid copolymer in dimethylsulfoxide separately prepared, an insoluble solid matter precipitated, thus, prohibiting cosolubilization of the water-insoluble colorant (organic pigment) and the acid group-containing polymer, and for that reason, the water dispersion was not prepared by mixing it with the aqueous medium.

Comparative Example 2

13.2 parts by mass (g) of C.I. Pigment Red 122, 6.6 parts by mass (g) of the following acid group-containing polymer A (styrene/methacrylic acid copolymer, acid value 180 mg-KOH/g, Mw=18,000), and 140 parts by mass (g) of dimethylsulfoxide were mixed, to give a suspension. Subsequently, 1 N potassium hydroxide aqueous solution (manufactured by Wako Pure Chemical Industries) was added in small portions for solubilization of the pigment. However in this case too, the pigment (PR-122) was soluble, but the styrene/methacrylic acid copolymer was insoluble, prohibiting cosolubilization. Addition of 1 N potassium hydroxide aqueous solution to a solution of the styrene/methacrylic acid copolymer dissolved in dimethylsulfoxide separately prepared resulted in precipitation of insoluble solid matter, prohibiting cosolubilization of the water-insoluble colorant (organic pigment) and the acid group-containing polymer and thus, the water dispersion was not prepared by mixing it with the aqueous medium.

Examples 2 to 10 and Comparative Examples 3 to 5

Pigment solutions were prepared in a similar manner to Example 1 and Comparative example 1, except that the pigment and the components used were changed to those shown in the following Table 1. In Examples 2 to 10, pigment dispersions 2 to 10 were prepared by using the pigment solution above. In Comparative examples 3 to 5, no pigment dispersion was prepared, because there was sediment in the pigment solutions. Results are summarized in Table 1. In the column of cosolubility, ○ means that the organic pigment/dispersant is completely dissolved in DMSO; x means that the organic pigment or the dispersant is not completely dissolved therein. In the column of dispersion preparation, ○ means that a transparent dilute dispersion was prepared; and x means that an opaque solution with coarse pigment particles was prepared.

TABLE 1

| | Water-insoluble colorant | Amount (g) | Acid group-containing polymer | Amount (g) | Organic solvent | Amount (g) | Dissolved base | Amount (g) | Cosolubility | Dispersion preparation | Added acid/solvent (11 ml/200 ml) | Filtration period |
|---|---|---|---|---|---|---|---|---|---|---|---|---|
| Example 1 | PR-122 | 13.2 | Dispersant A | 6.6 | DMSO | 140 | TMAH (25% MA) | 39 | ○ | ○ | Hydrochloric acid/Ethyl acetate | 5 min |
| Example 2 | PR-122 | 13.2 | Dispersant A | 6.6 | DMSO | 140 | TMAH (25% MA) | 39 | ○ | ○ | Hydrochloric acid/Acetone | 10 min |
| Example 3 | PR-122 | 13.2 | Dispersant A | 6.6 | DMSO | 140 | TMAH (25% MA) | 39 | ○ | ○ | Acetic acid/Ethyl acetate | 7 min |
| Example 4 | PR-122 | 13.2 | Dispersant A | 6.6 | DMSO | 100 | TEAH (20% water) | 79 | ○ | ○ | Hydrochloric acid/Ethyl acetate | 4 min |
| Example 5 | PR-122 | 13.2 | Dispersant A | 6.6 | DMSO | 125 | TPAH (40% water) | 55 | ○ | ○ | Hydrochloric acid/Ethyl acetate | 4 min |
| Example 6 | PR-122 | 13.2 | Dispersant A | 6.6 | NMP | 140 | TMAH (25% MA) | 39 | ○ | ○ | Hydrochloric acid/Ethyl acetate | 5 min |
| Example 7 | PR-122 | 13.2 | Dispersant B | 6.6 | DMSO | 140 | TMAH (25% MA) | 39 | ○ | ○ | Hydrochloric acid/Ethyl acetate | 10 min |
| Example 8 | PR-122 | 13.2 | Dispersant C | 6.6 | NMP | 140 | TMAH (25% MA) | 39 | ○ | ○ | Hydrochloric acid/Ethyl acetate | 12 min |
| Example 9 | PR-254 | 13.2 | Dispersant A | 6.6 | DMSO | 140 | TMAH (25% MA) | 38 | ○ | ○ | Hydrochloric acid/Ethyl acetate | 5 min |
| Example 10 | PY-74 | 13.2 | Dispersant A | 6.6 | DMSO | 140 | TMAH (25% MA) | 39 | ○ | ○ | Hydrochloric acid/Ethyl acetate | 3 min |
| Comparative example 1 | PR-122 | 13.2 | Dispersant A | 6.6 | DMSO | 160 | NaOMe (28% MA) | 21 | x | x | Unexamined | — |
| Comparative example 2 | PR-122 | 13.2 | Dispersant A | 6.6 | DMSO | 140 | KOH (1N water) | 39 | x | x | Unexamined | — |
| Comparative example 3 | PR-122 | 13.2 | Dispersant A | 6.6 | DMSO | 150 | DABCO | 12 | x | x | Unexamined | — |
| Comparative example 4 | PR-254 | 13.2 | Dispersant A | 6.6 | DMSO | 160 | NaOMe (28% MA) | 20 | x | x | Unexamined | — |
| Comparative example 5 | PY-74 | 13.2 | Dispersant A | 6.6 | DMSO | 160 | NaOMe (28% MA) | 21 | x | x | Unexamined | — |

TABLE 1-continued

| Water-insoluble colorant | Amount (g) | Acid group-containing polymer | Amount (g) | Organic solvent | Amount (g) | Dissolved base | Amount (g) | Cosolubility | Dispersion preparation | Added acid/solvent (11 ml/200 ml) | Filtration period |
|---|---|---|---|---|---|---|---|---|---|---|---|

Acid group-containing polymer A (Dispersant A)

Acid group-containing polymer B (Dispersant B)

Acid group-containing polymer C (Dispersant C)

Acid group-containing polymer D (Dispersant D)

Acid group-containing polymer E (Dispersant E)

The terminal groups of the polymer compounds represented by the above Formulae are hydrogen atoms.

Example 11

Subsequently, the pigment dispersion 1 was placed in a 3 L flask and stirred under heat at 50° C. for 3 hours. The dispersion was then cooled to room temperature, and 11 ml of hydrochloric acid was added thereto dropwise to a pH of about 3 for aggregation of the pigment particles in the pigment dispersion. 200 ml of ethyl acetate was then added thereto additionally (see Table 1); the mixture was stirred for 2 hours, filtered through a membrane filter having an average pore size of 0.2 µm under reduced pressure, washed with ion-exchanged water twice, and dried under vacuum (45° C.) for one day, to give a demineralized and solvent-free PR-122 (quinacridone organic pigment)/acid group-containing polymer aggregate powder. The filtration then took a period of 5 minutes.

0.8 part by mass (g) of tetramethylammonium hydroxide (15 mass % aqueous solution, redispersion base) was then added to 1 part by mass (g) of the powder; ion-exchanged water (redispersion aqueous medium) was added thereto to adjust a pigment concentration of 10%; and the resulting mixture was redispersed by ultrasonic treatment, to give a pigment dispersion 11. The number-average particle diameter of the pigment dispersion 11, as determined by the dynamic light-scattering method, was 28.6 nm (TEM average particle diameter: 25.4 nm), demonstrating that a very concentrated dispersion highly superior in monodispersibility was obtained. There was no change in particle diameter and no sediment observed after storage for 2 weeks.

The pigment dispersions 2 to 10 prepared in Examples 2 to 10 were also aggregated by addition of the acid/solvent shown in Table 1, filtered and washed, similarly to Example 11. The filtration periods required then are summarized in Table 1, all indicating efficient filtration.

Examples 12 to 19 and Comparative examples 6 to 17

Pigment dispersions 12 to 19 and c6 to c17 were prepared in a manner similar to Example 11, except that the pigment dispersion and/or the components added were changed to those shown in Table 2. The particle diameters of the fine particles in the dispersions obtained were determined and the results are summarized in Table 2. Aggregation of the pigment fine particles can be determined by using an indicator that the volume average particle diameter, as determined by the dynamic light-scattering, is approximately twice or more larger than the TEM average particle diameter or that the volume average particle diameter, as determined by dynamic light-scattering, is 50 nm or more when the TEM average particle diameter is 20 to 30 nm.

The pigment dispersions used in Comparative example 13 and 14 were dispersions prepared in a manner similar to pigment dispersion 2, except that the dispersant A was replaced with dispersant D or E.

TABLE 2

| | Aggregate (Pigment) | Acid group-containing polymer | Pigment dispersion | Conc. of Pigment (wt %) | Amount (g) | Aqueous medium | Amount (g) | Dispersed base | Amount (g) | Redispersion period | TEM average particle diameter (nm) | Dynamic light scattering average particle diameter (nm) |
|---|---|---|---|---|---|---|---|---|---|---|---|---|
| Example 11 | PR-122 | Dispersant A | 1 | 10 | 0.97 | water | 4.1 | TMAH (15% water) | 0.8 | 1 h | 25.4 | 28.6 |
| Example 12 | PR-122 | Dispersant A | 2 | 15 | 0.97 | water | 2.1 | TMAH (15% water) | 0.8 | 1 h | 26.5 | 29.7 |
| Example 13 | PR-122 | Dispersant A | 2 | 10 | 0.97 | water | 4.5 | Choline Hydroxide (49% water) | 0.4 | 1 h | 25.2 | 26.6 |
| Example 14 | PR-122 | Dispersant A | 2 | 10 | 0.97 | water | 3.8 | TEAH (20% water) | 1 | 1 h | 25.2 | 26.6 |
| Example 15 | PR-122 | Dispersant A | 2 | 10 | 0.97 | water | 3.6 | TPAH (10% water) | 1.2 | 1 h | 26.6 | 33.5 |
| Example 16 | PR-122 | Dispersant B | 7 | 10 | 0.97 | water | 4.1 | TMAH (15% water) | 0.8 | 1.5 h | 27.6 | 44.2 |
| Example 17 | PR-122 | Dispersant C | 8 | 10 | 0.97 | water | 4.1 | TMAH (15% water) | 0.8 | 1 h | 31.2 | 33.2 |
| Example 18 | PR-254 | Dispersant A | 9 | 10 | 0.97 | water | 4.1 | TMAH (15% water) | 0.8 | 1 h | 31.2 | 40.6 |
| Example 19 | PY-74 | Dispersant A | 10 | 10 | 0.97 | water | 4.1 | TMAH (15% water) | 0.8 | 1 h | 28.5 | 33.5 |
| Comparative example 6 | PR-122 | Dispersant A | 2 | 10 | 0.97 | water | 3.8 | TBAH (40% water) | 0.85 | 1 h | 28.6 | 55.9 |
| Comparative example 7 | PR-122 | Dispersant A | 2 | 10 | 0.97 | water | 0 | THAH (15% water) | 5 | 1 h | 32.2 | 86.3 |
| Comparative example 8 | PR-122 | Dispersant A | 2 | 15 | 0.97 | water | 3 | TBAH (40% water) | 1.6 | 1 h | Unexamined because of solidification | Unexamined because of solidification |
| Comparative example 9 | PR-122 | Dispersant A | 2 | 10 | 0.97 | water | 4.7 | DABCO | 0.2 | Not dispersible | Unexamined | Unexamined |
| Comparative example 10 | PR-122 | Dispersant A | 2 | 10 | 0.97 | water | 4.9 | NH$_3$ (30% water) | 0.1 | Not dispersible | Unexamined | Unexamined |
| Comparative example 11 | PR-122 | Dispersant B | 7 | 10 | 0.97 | water | 3.6 | TBAH (40% water) | 1.3 | 12 h | 27.6 | 89.3 |
| Comparative example 12 | PR-122 | Dispersant C | 8 | 10 | 0.97 | water | 3.6 | TBAH (40% water) | 1.3 | 8 h | 31.2 | 54.7 |
| Comparative example 13 | PR-122 | Dispersant D | 2 | 10 | 0.97 | water | 3.6 | TBAH (40% water) | 1.3 | 6 h | 29.1 | 145.8 |
| Comparative example 14 | PR-122 | Dispersant E | 2 | 10 | 0.97 | water | 3.6 | | | | | |
| Comparative example 15 | PR-254 | Dispersant A | 9 | 10 | 0.97 | water | 3.6 | | | | | |
| Comparative example 16 | PY-74 | Dispersant A | 10 | 10 | 0.97 | water | 3.6 | | | | | |
| Comparative example 17 | PR-122 | Dispersant A | 2 | 10 | 0.97 | water | 3.6 | | | | | |

TABLE 2-continued

| | | | | | |
|---|---|---|---|---|---|
| Comparative example 14 | TBAH (40% water) | 1.3 | 6 h | Unexamined because of solidification | Unexamined because of solidification |
| Comparative example 15 | TBAH (40% water) | 1.3 | 8 h | 31.2 | 84.6 |
| Comparative example 16 | TBAH (40% water) | 1.3 | 4 h | 28.5 | 52.1 |
| Comparative example 17 | NaOH (1N water) | 1.3 | 6 h | 26.8 | 52.6 |

The abbreviations in the Tables respectively mean the followings.
TMAH: tetramethylammonium hydroxide (ClogP: −4.586)
TEAH: tetraethylammonium hydroxide (ClogP: −3.14)
TPAH: tetrapropylammonium hydroxide (ClogP: −1.024)
TBAH: tetrabutylammonium hydroxide (ClogP: +1.092)
THAH: tetrahexylammonium hydroxide (ClogP: +5.324)
DABCO: 1,4-diazabicyclo[2.2.2]octane
DMSO: dimethyl sulfoxide
NMP: N-methylpyrrolidone
Choline Hydroxide: see following Formula (a):

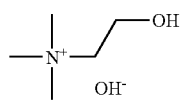

Formula (a)

Examples 20 to 24

(Preparation of Ink Composition)
50 parts by mass of the pigment dispersion 11, 14, 15, 18 or 19, 7.5 parts by mass of diethylene glycol, 5 parts by mass of glycerol, 5 parts by mass of trimethylolpropane, 0.2 part by mass of Acetylenol EH (trade name, manufactured by Kawaken Fine Chemicals) and 32.3 parts by mass of ion-exchanged water were mixed with each other and subjected to an ultrasonic treatment, to give ink compositions (pigment dispersions) A to E.

Comparative Examples 18 to 21

50 parts by mass of the pigment dispersion c6, c7, c15, or c16, 7.5 parts by mass of diethylene glycol, 5 parts by mass of glycerol, 5 parts by mass of trimethylolpropane, 0.2 part by mass of Acetylenol EH and 32.3 parts by mass of ion-exchanged water were mixed with each other and subjected to an ultrasonic treatment, to give ink compositions (pigment dispersions) F to I.

[Evaluation of Storage Stability]
The average particle diameter of each ink composition A to I obtained on the day of preparation was determined by dynamic light-scattering. Subsequently, after storage of the ink composition under heat at 60° C., the average particle diameter thereof was measured once again by dynamic light-scattering. The variation rates in particle diameter are shown in Table 3. Smaller variation rate in particle diameter means that the ink composition is more favorable in storage stability.

TABLE 3

| | Ink composition | | | | Evaluation of storage stability | | |
|---|---|---|---|---|---|---|---|
| | Sample | Pigment | Dispersant | Dispersed base | Initial value (nm) | After storage under heating (nm) | Variation rate in particular diameter (%) |
| Example 20 | Pigment dispersion A | PR-122 | Dispersant A | TMAH | 30.2 | 35.6 | 17.9 |
| Example 21 | Pigment dispersion B | PR-122 | Dispersant A | TEAH | 35.6 | 44.5 | 25.0 |
| Example 22 | Pigment dispersion C | PR-122 | Dispersant A | TPAH | 32.6 | 47.8 | 46.6 |
| Example 23 | Pigment dispersion D | PR-254 | Dispersant A | TMAH | 31.5 | 37.1 | 17.8 |
| Example 24 | Pigment dispersion E | PY-74 | Dispersant A | TMAH | 31.5 | 37.1 | 17.8 |
| Comparative example 18 | Pigment dispersion F | PR-122 | Dispersant A | TBAH | 62.1 | 126.4 | 103.5 |
| Comparative example 19 | Pigment dispersion G | PR-122 | Dispersant A | THAH | 89.3 | 269.5 | 201.8 |
| Comparative example 20 | Pigment dispersion H | PR-254 | Dispersant A | TBAH | 89.3 | 214.3 | 140.0 |
| Comparative example 21 | Pigment dispersion I | PY-74 | Dispersant A | TBAH | 56.7 | 156.9 | 176.7 |

As obvious from the results shown in Tables 1 to 3, the dispersion is prepared favorably by using a phase-transfer base represented by Formula (I) or (II) either in the step of forming fine particles by mixing a pigment solution with water (cosolubilization) or in the step of redispersing the aggregate (redispersion speed, average particle diameter), and the ink compositions thus prepared are superior in storage stability (variation rate in particle diameter). It was also found then that the length of the alkyl chain in the phase-transfer base was preferably shorter for more favorable stability. It is probably because dispersed fine particles carrying hydrophilic cations are easily stabilized in an aqueous medium and resistant to ionic crosslinking among particles that may occur when an alkali metal was used.

[Evaluation of Discharging Property]

Each of the ink compositions (the pigment dispersions) A to I that were prepared as described above was charged into a cartridge of an inkjet printer PX-G930 (trade name, manufactured by Seiko-Epson). Using the inkjet printer, a solid image (reflection density: 1.0) was printed at the whole surface of an inkjet paper (a photographic base paper "Gloss" manufactured by Seiko-Epson) to count numbers of "white streaks" generated during print. Evaluation of discharging property was performed according to the criterion as set below:

3: There is no generation of white streaks (non-printed area) all over the printing surface.

2: Generation of white streaks is slightly observed, which is no problem in practice.

1: Generation of white streaks is frequently observed all over the printing surface, which is not an allowable quality in practice.

The results of evaluation are shown in Table 4.

TABLE 4

| | Ink Composition | Discharging Property |
|---|---|---|
| A | (Example 1)-(Example 20) | 3 |
| B | (Example 2)-(Example 21) | 3 |
| C | (Example 2)-(Example 22) | 3 |
| D | (Example 9)-(Example 23) | 3 |
| E | (Example 10)-(Example 24) | 3 |
| F | (Comparative Example 6)-(Comparative Example 18) | 2 |
| G | (Comparative Example 7)-(Comparative Example 19) | 1 |
| H | (Comparative Example 15)-(Comparative Example 20) | 2 |
| I | (Comparative Example 16)-(Comparative Example 21) | 1 |

As obvious from Table 4, ink compositions prepared with the pigment dispersions in Examples are superior in discharging efficiency.

[Evaluation of Transparency]

The transparency of the film obtained by applying each of the ink compositions A to I on a polyethylene terephthalate (PET) sheet having a thickness of 60 μm by bar coater and drying the resulting wet film was evaluated by visual observation.

2: Excellent

1: Poor

[Evaluation of Pigment Particle Diameter]

The TEM average particle diameter was calculated by the method described above.

The results of each of evaluations are shown in Table 5.

TABLE 5

| | Ink Composition | TEM average particle diameter [nm] | Transparency |
|---|---|---|---|
| A | (Example 1)-(Example 20) | 28.3 | 2 |
| B | (Example 2)-(Example 21) | 33.6 | 2 |
| C | (Example 2)-(Example 22) | 30.5 | 2 |
| D | (Example 9)-(Example 23) | 29.3 | 2 |
| E | (Example 10)-(Example 24) | 34.2 | 2 |
| F | (Comparative Example 6)-(Comparative Example 18) | 26.9 | 1 |
| G | (Comparative Example 7)-(Comparative Example 19) | 34.2 | 1 |
| H | (Comparative Example 15)-(Comparative Example 20) | 27.9 | 1 |
| I | (Comparative Example 16)-(Comparative Example 21) | 31.2 | 1 |

As obvious from Table 5, the printed articles prepared by using each of the ink compositions A to E were superior in transparency even when printed at higher density and thus, the ink compositions are useful.

The results show that fine particles dispersed by using a phase-transfer base represented by Formula (I) or (II) can remain unseparated without any secondary aggregation, thus giving an ink superior in discharging stability and in high transparency even in the higher concentration region and also an ink composition superior in color reproducibility.

Having described our invention as related to the present embodiments, it is our intention that the present invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2008-060277 filed in Japan on Mar. 10, 2008, which is entirely herein incorporated by reference.

What is claimed is:

1. A water-insoluble colorant dispersion prepared by a production method including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the following Formula (I) or (II), and a step of mixing the solution obtained in the above step with an aqueous medium, to thereby obtain the water-insoluble colorant dispersion containing water-insoluble colorant fine particles having an average particle size of from 5 nm to 50 nm, a polymer compound having one or more acid groups selected from the group consisting of carboxylic acid group, sulfonic acid group and phosphoric acid group as hydrophilic group, an aqueous medium, and a phase-transfer base represented by the following Formula (I) or (II):

Formula (I)

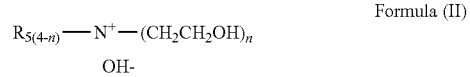

Formula (II)

wherein $R_1$, $R_2$, $R_3$, $R_4$ and $R_5$ each independently represents a methyl group, an ethyl group, or a propyl group, n represents an integer of 1 to 4, wherein an acid value of the polymer compound having one or more acid groups is 100 mg-KOH/g to 300 mg-KOH/g.

2. The water-insoluble colorant dispersion according to claim 1, wherein the phase-transfer base has a negative ClogP value.

3. The water-insoluble colorant dispersion according to claim 1, wherein the acid group is a carboxylic acid group.

4. The water-insoluble colorant dispersion according to claim 1, wherein the water-insoluble colorant is an organic pigment selected from the group consisting of quinacridone organic pigments, diketopyrrolopyrrole organic pigments, and monoazo yellow organic pigments.

5. A method of producing a water-insoluble colorant dispersion, including a step of codissolving a water-insoluble colorant and a polymer compound having one or more acid groups selected from carboxylic acid group, sulfonic acid group and phosphoric acid group as hydrophilic group in an organic solvent in the presence of a phase-transfer base represented by the following Formula (I) or (II), and a step of mixing the solution obtained in the above step with an aqueous medium, generating the water-insoluble colorant fine particles, and dispersing the fine particles;

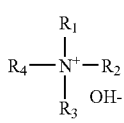

Formula (I)

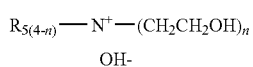

Formula (II)

wherein $R_1$, $R_2$, $R_3$, $R_4$ and $R_5$ each independently represents a methyl group, an ethyl group, or a propyl group, n represents an integer of 1 to 4, the water-insoluble colorant fine particles have an average particle size of from 5 nm to 50 nm, and an acid value of the polymer compound having one or more acid groups is 100 mg-KOH/g to 300 mg-KOH/g.

6. A recording liquid produced by the dispersion according to claim 1, wherein the water-insoluble colorant is contained in an amount of 0.1 to 15% by mass with respect to a total mass of the recording liquid.

7. The recording liquid according to claim 6, wherein the recording liquid is an inkjet recording liquid.

8. An ink set using the inkjet recording liquid according to claim 7.

9. An image-forming method, comprising: a step of recording an image by providing, with a medium, the recording liquid according to claim 6.

10. An image-forming apparatus having a means that can record an image by providing, with a medium, the recording liquid according to claim 6.

11. The water-insoluble colorant dispersion according to claim 1, wherein the production method further comprises concentrating the water-insoluble fine particles and redispersing the same in an aqueous medium.

12. The water-insoluble colorant dispersion according to claim 1, wherein the content of the phase-transfer base in the water-insoluble colorant dispersion is 0.5 to 10 mol equivalent with respect to 1 mol equivalent of the acid group in the acid group-containing polymer compound.

13. The water-insoluble colorant dispersion according to claim 11, wherein the water-insoluble fine particles are redispersed in the presence of the phase-transfer base.

14. The water-insoluble colorant dispersion according to claim 1, wherein the average particle size of the water-insoluble colorant fine particles is determined by a dynamic light-scattering method.

15. The water-insoluble colorant dispersion according to claim 1, wherein the water-insoluble colorant fine particles are present in the dispersion independent of the polymer compound having one or more acid groups.

16. The water-insoluble colorant dispersion according to claim 1, wherein the polymer compound having one or more acid groups is adsorbed on the water-insoluble colorant fine particles contained in the water-insoluble colorant dispersion.

17. The water-insoluble colorant dispersion according to claim 1, wherein a variation rate in particle diameter of the water-insoluble colorant fine particles contained in the water-insoluble colorant dispersion does not exceed 46.6%.

18. The method of producing a water-insoluble colorant dispersion according to claim 5, further including a step of mixing the water-insoluble colorant dispersion with an organic acid and/or an inorganic acid to obtain aggregate of the water-insoluble colorant fine particles, and a step of redispersing the aggregate by mixing it with an aqueous medium for disintegration of the aggregated fine particles.

19. The method of producing a water-insoluble colorant dispersion according to claim 18, wherein the phase-transfer base represented by Formula (I) or (II) is added to the mixture of the aggregate and the aqueous medium.

* * * * *